US012424025B2

United States Patent
Namiki

(10) Patent No.: US 12,424,025 B2
(45) Date of Patent: Sep. 23, 2025

(54) PERSONAL AUTHENTICATION APPARATUS AND CONTROL METHOD

(71) Applicant: CANON KABUSHIKI KAISHA, Tokyo (JP)

(72) Inventor: Kazuhiro Namiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 431 days.

(21) Appl. No.: 17/873,309

(22) Filed: Jul. 26, 2022

(65) Prior Publication Data
US 2023/0054098 A1    Feb. 23, 2023

(30) Foreign Application Priority Data
Aug. 17, 2021   (JP) .................................. 2021-132949

(51) Int. Cl.
G06V 40/18    (2022.01)
G06V 10/26    (2022.01)
G06V 10/60    (2022.01)
G06V 10/774   (2022.01)

(52) U.S. Cl.
CPC .......... *G06V 40/193* (2022.01); *G06V 10/267* (2022.01); *G06V 10/60* (2022.01); *G06V 10/774* (2022.01); *G06V 40/197* (2022.01)

(58) Field of Classification Search
CPC .... G06V 40/193; G06V 10/267; G06V 10/60; G06V 10/774; G06V 40/197; G06V 10/26; G06V 10/454; G06V 10/82
See application file for complete search history.

(56) References Cited

U.S. PATENT DOCUMENTS

| 2005/0238230 A1* | 10/2005 | Yoshida ................. H04N 1/624 |
| | | 382/167 |
| 2005/0283450 A1* | 12/2005 | Matsugu ................. G06N 3/049 |
| | | 706/20 |
| 2017/0228594 A1* | 8/2017 | Takemoto ............... G06V 10/50 |
| 2019/0045100 A1* | 2/2019 | Michishita ............... H04N 5/33 |

FOREIGN PATENT DOCUMENTS

JP    2018073369 A   *   5/2018

OTHER PUBLICATIONS

Yung-Hui Li, An Efficient and Robust Iris Segmentation Algorithm Using Deep Learning, Jan. 2, 2019, Hindawi, vol. 2019 (Year: 2019) (Year: 2019).*
Yung-Hui Li, An Efficient and Robust Iris Segmentation Algorithm Using Deep Learning, Jan. 2, 2019, Hindawi, vol. 2019 (Year: 2019).*

* cited by examiner

*Primary Examiner* — Oneal R Mistry
*Assistant Examiner* — Justin Philip Cascais
(74) *Attorney, Agent, or Firm* — Venable LLP

(57)   ABSTRACT

A personal authentication apparatus comprises a first image capture unit that captures an eyeball image, a first image processing unit that obtains brightness information of the captured eyeball image and generates divided eyeball images by dividing a region of the eyeball image based on the brightness information of the eyeball image, a first storage unit that stores brightness information of the divided eyeball images and position information of the divided eyeball images in relation to the eyeball image in association with each other, and a learning unit that executes different types of learning processing respectively for the divided eyeball images in accordance with the brightness information and the position information of the divided eyeball images.

7 Claims, 8 Drawing Sheets

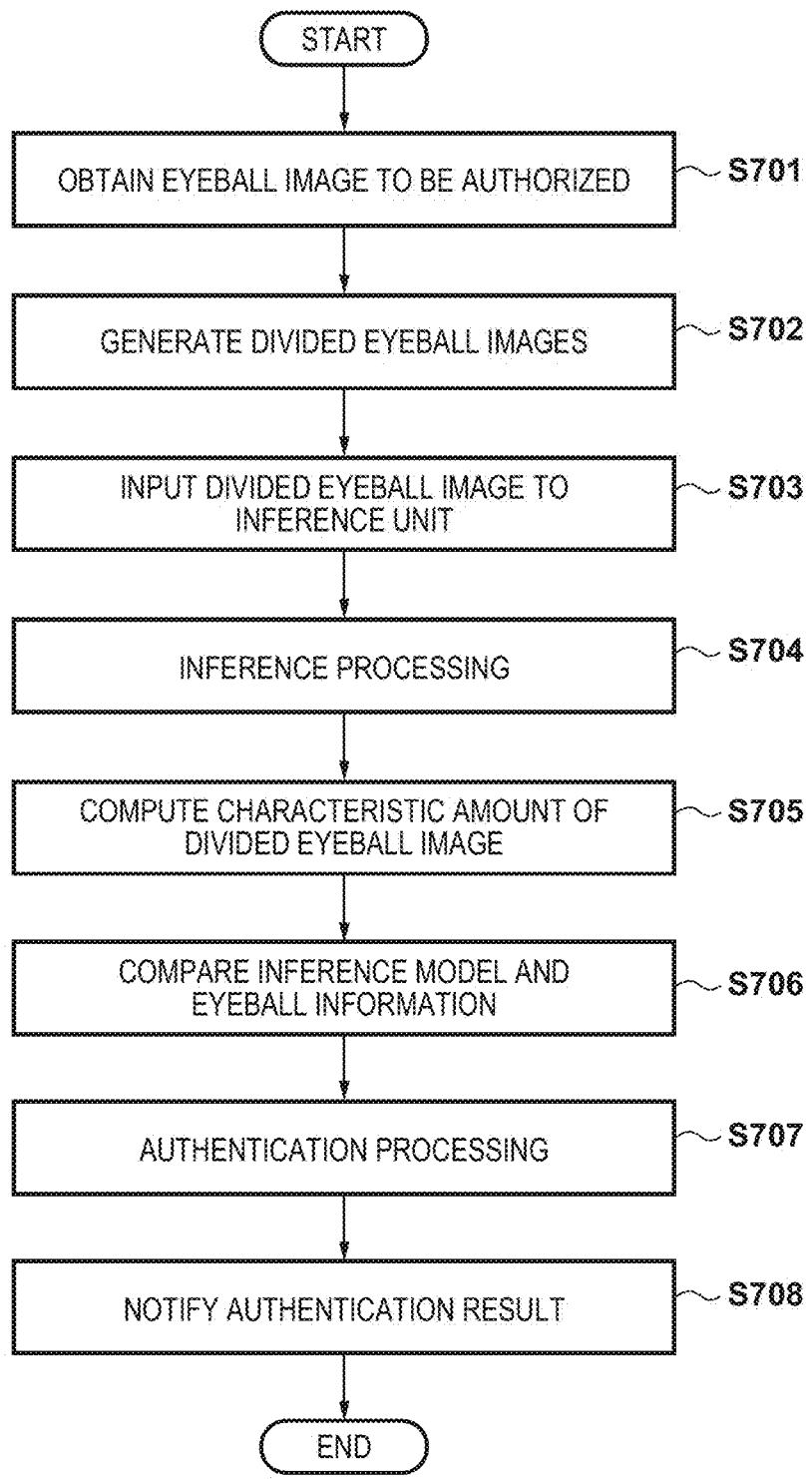

PERSONAL AUTHENTICATION APPARATUS AND CONTROL METHOD

BACKGROUND OF THE INVENTION

Field of the Invention

The present invention relates to a personal authentication technique that uses an eyeball image.

Description of the Related Art

Iris authentication is known as one of personal authentication techniques that use an eyeball image. Although iris authentication is based on the precondition that it is used indoors under low external light, it is also provided on an electronic device that is frequently used outdoors, such as a smartphone. In a case where iris authentication is performed under external light that contains a large amount of near-infrared components, such as solar light, near-infrared light emitted by the Sun and the like, as well as near-infrared light reflected by an object irradiated with the Sun and the like, reflects on an eyeball over a wide range. Therefore, in a case where iris authentication is performed under external light, there is a possibility that the authentication fails because an iris code that is computed from an eyeball image captured under external light does not match an iris code that has been registered in advance.

Japanese Patent Laid-Open No. 2018-73369 suggests a technique that aims to improve the accuracy at the time of iris authentication even in a case where the illuminance has changed due to the environment at the time of iris authentication and the change has caused the pupil size to change. Japanese Patent Laid-Open No. 2018-73369 aims to improve the accuracy at the time of iris authentication by registering iris data indicating changes in a pupil in advance, and changing the brightness of an iris image that captured an iris with use of lighting provided on a device at the time of iris authentication so as to create the same situation as the time of generation of the registered iris data.

However, the method that changes the brightness of an iris image as with Japanese Patent Laid-Open No. 2018-73369 cannot address, for example, a case where an iris image shows regions with different brightness levels due to exposure of external light, or a case where a part of pixels in an iris image has become saturated because of the reflection of external light.

SUMMARY OF THE INVENTION

The present invention has been made in consideration of the aforementioned problems, and realizes a technique to suppress a decrease in the authentication accuracy due to exposure and reflection of external light on an eyeball.

In order to solve the aforementioned problems, the present invention provides a personal authentication apparatus, comprising: a memory and at least one processor and/or at least one circuit which function as: a first image capture unit configured to capture an eyeball image; a first image processing unit configured to obtain brightness information of the eyeball image captured by the first image capture unit, and generate divided eyeball images by dividing a region of the eyeball image based on the brightness information of the eyeball image; a first storage unit configured to store brightness information of the divided eyeball images and position information of the divided eyeball images in relation to the eyeball image in association with each other; and a learning unit configured to execute different types of learning processing respectively for the divided eyeball images in accordance with the brightness information and the position information of the divided eyeball images.

In order to solve the aforementioned problems, the present invention provides a method of controlling a personal authentication apparatus, comprising: capturing an eyeball image; obtaining brightness information of the captured eyeball image, and generating divided eyeball images by dividing a region of the eyeball image based on the brightness information of the eyeball image; storing brightness information of the divided eyeball images and position information of the divided eyeball images in relation to the eyeball image in association with each other; and executing different types of learning processing respectively for the divided eyeball images in accordance with the brightness information and the position information of the divided eyeball images.

In order to solve the aforementioned problems, the present invention provides a non-transitory computer-readable storage medium storing a program for causing a computer to function as each unit of a personal authentication apparatus comprising a first image capture unit configured to capture an eyeball image; a first image processing unit configured to obtain brightness information of the eyeball image captured by the first image capture unit, and generate divided eyeball images by dividing a region of the eyeball image based on the brightness information of the eyeball image; a first storage unit configured to store brightness information of the divided eyeball images and position information of the divided eyeball images in relation to the eyeball image in association with each other; and a learning unit configured to execute different types of learning processing respectively for the divided eyeball images in accordance with the brightness information and the position information of the divided eyeball images.

According to the present invention, the decrease in the authentication accuracy due to exposure and reflection of external light on the eyeball.

Further features of the present invention will become apparent from the following description of exemplary embodiments (with reference to the attached drawings).

BRIEF DESCRIPTION OF THE DRAWINGS

FIG. 7 is a flowchart illustrating inference processing for personal authentication, which is performed by the inference apparatus of the present embodiment.

DESCRIPTION OF THE EMBODIMENTS

Figure 1:
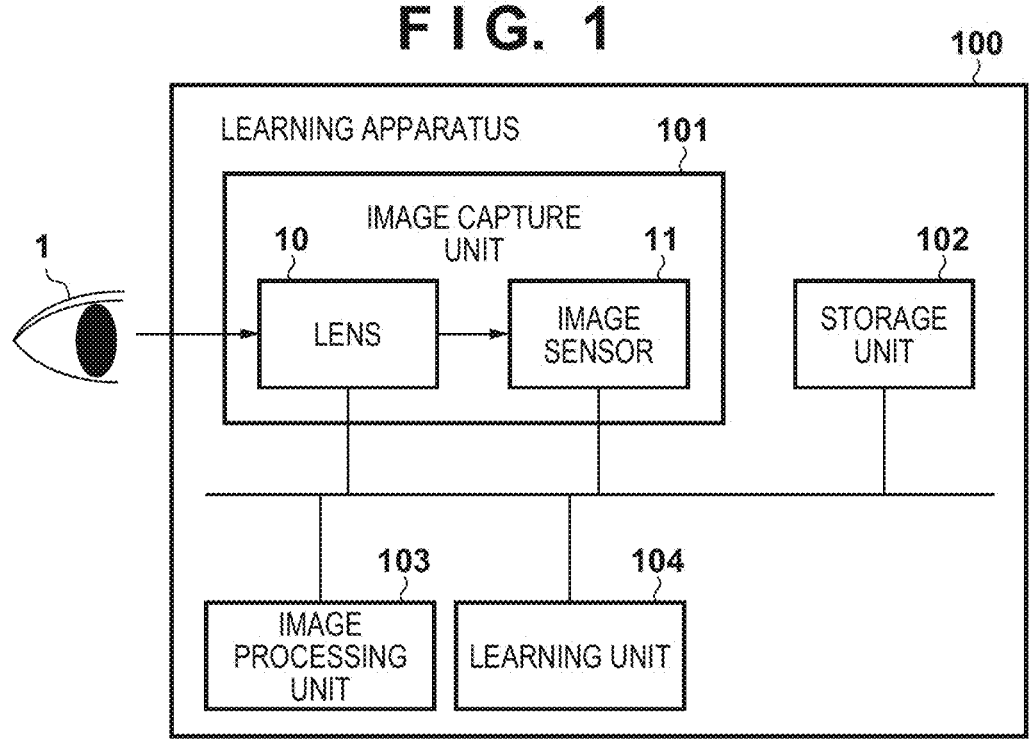
FIG. 1 is a block diagram illustrating a hardware configuration of a learning apparatus of the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Although the present embodiment will be described using an example in which a personal authentication apparatus is applied to a camera provided with a finder, the present invention is not limited to this; for example, the application is also possible in a case where identity authentication is performed when unlocking an electronic device, such as a smart device and a tablet device, and when logging into an online service and the like, by way of biometric authentication that uses an eyeball image of a person.

The personal authentication apparatus of the present embodiment suppresses a decrease in the accuracy and the reliability degree of personal authentication by capturing an eyeball image of a person, performing different types of learning processing respectively for regions of the eyeball image that have different brightness levels due to exposure and reflection of external light on an eyeball, and collating the characteristic amounts of an eyeball image of a registered person with the characteristic amounts of an eyeball image of a person to be authenticated in inference processing that uses the result of the learning processing.

In the present embodiment, an eyeball image is an iris image obtained by capturing an iris and a pupil of a person. Also, the characteristic amounts of an eyeball image are unique information obtained from the pattern of an iris. Furthermore, external light refers to solar light or ambient light that is incident on an eyeball from a lighting device and the like. Moreover, the reflection of external light on an eyeball refers to the formation of a bright portion and a dark portion in an iris region due to external light.

The personal authentication apparatus of the present embodiment includes a learning apparatus 100 and an inference apparatus 200 that perform machine learning, such as deep learning that uses a convolutional neural network (hereinafter, CNN). Note that an algorithm of machine learning is not limited to deep learning that uses a CNN, and may be an algorithm such as linear regression, a decision tree, a random forest, logistic regression, a support-vector machine, naive Bayes, k-nearest neighbor, clustering, and association analysis. Using an eyeball image as an input, the learning apparatus 100 computes CNN weight information. Using an eyeball image as an input, the inference apparatus 200 performs inference processing for personal registration in which the characteristic amounts of an eyeball image of a person to be registered are computed using the CNN weight information generated by the learning apparatus 100 and the computed characteristic amounts are registered, as well as inference processing for personal authentication in which personal authentication is performed by collating the registered characteristic amounts of an eyeball image and the characteristic amounts of an eyeball image of a person to be authenticated.

[Configuration of Learning Apparatus 100]

First, the configuration and functions of the learning apparatus 100 in the personal authentication apparatus of the present embodiment will be described with reference to FIG. 1.

The learning apparatus 100 includes an image capture unit 101, a storage unit 102, an image processing unit 103, and a learning unit 104.

The image capture unit 101 includes an eyepiece lens 10 for observing an image of an eyeball of a person 1 who looks into a finder. The image of the eyeball that has been transmitted through the eyepiece lens 10 is formed on an image capture surface of an eyeball image sensor 11, such as a CMOS, in which photoelectric conversion elements are two-dimensionally arranged.

The storage unit 102 is a storage medium, such as a memory card and a hard disk, that stores a machine learning program and eyeball images captured by the image capture unit 101 or eyeball images captured by an external device, such as a digital camera.

The image processing unit 103 is a processor that, with respect to an eyeball image stored in the storage unit 102, divides a region of the eyeball image based on the brightness of an iris region. Specifically, the image processing unit 103 detects luminance values of the eyeball image for respective pixels, computes a luminance pattern corresponding to regions in which pixels having similar luminance values, or luminance values within a predetermined luminance range, are distributed, and generates divided eyeball images by dividing the region of the eyeball image in accordance with the luminance pattern. Also, the image processing unit 103 computes position information of each divided eyeball image in relation to the eyeball image, as well as position information of iris portions of the divided eyeball images in relation to the iris of the eyeball image, as a positional relationship between the eyeball image and the divided eyeball images, and stores them into the storage unit 102. Furthermore, the image processing unit 103 computes brightness information of the divided eyeball images, for example, an average luminance value of the divided eyeball images, and stores the same into the storage unit 102. The method of dividing the eyeball image used by the image processing unit 103 will be described later.

The learning unit 104 is a computer including a processor, which computes CNN weight information based on divided eyeball images stored in the storage unit 102 and on brightness information and position information of the divided eyeball images, and a memory. The learning unit 104 learns an eyeball image based on divided eyeball images according to a luminance pattern and on brightness information and position information of the divided eyeball images. Brightness information includes the direction of brightness (the direction in which external light is incident on an eyeball) and the intensity of brightness (the intensity that causes a difference in lightness in images). Regarding the direction of brightness, the position and the direction of the image capture unit 101 with respect to an eyeball of a user are obtained using a GPS and the like. CNN weight information is a coefficient for changing the weight of inference processing for each divided eyeball image in an inference unit 204 of the inference apparatus 200, which will be described later. In the present embodiment, it is assumed that the learning apparatus 100 is connected online to a network, such as the CNN and the Internet. A software configuration and processing of the learning apparatus 100 will be described later.

[Configuration of Inference Apparatus 200]

Figure 2:
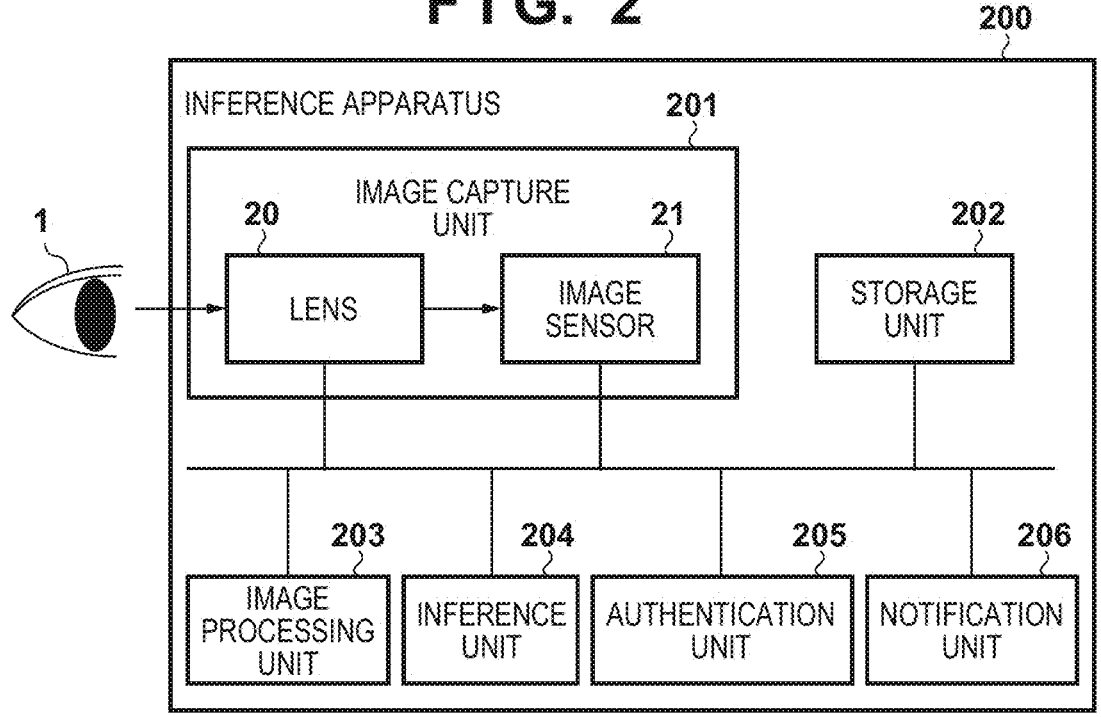
FIG. 2 is a block illustrating a hardware configuration of an inference apparatus of the present embodiment.

Next, the configuration and functions of the inference apparatus 200 in the personal authentication apparatus of the present embodiment will be described with reference to FIG. 2.

The inference apparatus 200 performs inference processing for personal registration, which registers the characteristic amounts of an eyeball image obtained by inferring an eyeball image of a person to be registered, as well as inference processing for personal authentication, which performs personal authentication by collating the characteristic amounts of an eyeball image of a registered person with the characteristic amounts of an eyeball image of a person to be authenticated.

The inference apparatus 200 includes an image capture unit 201, a storage unit 202, an image processing unit 203, an inference unit 204, an authentication unit 205, and a notification unit 206. Note that the image capture unit 201, the storage unit 202, and the image processing unit 203 are similar to the image capture unit 101, the storage unit 102, and the image processing unit 103 of the learning apparatus 100, and thus the details thereof are omitted.

The inference unit 204 is a computer including a processor, which computes the characteristic amounts of eyeball images for personal registration and personal authentication with use of CNN weight information that has been computed by performing different types of learning processing for respective divided eyeball images in the learning apparatus 100, and a memory. In the inference processing for personal registration, the inference unit 204 captures an eyeball image of a person to be registered with use of the image capture unit 201, and generates divided eyeball images by dividing the region of the eyeball image in accordance with brightness information with use of the image processing unit 203, similarly to the learning apparatus 100. Then, the inference unit 204 computes the characteristic amounts of an eyeball image of a person to be registered based on the divided eyeball images and on brightness information and position information of the divided eyeball images, generates inference models associated with unique information of the person to be registered, such as the name and the date, month, and year of birth, and stores the inference models into the storage unit 202 (register the inference models). Also, in the inference processing for personal authentication, the inference unit 204 captures an eyeball image of a person to be authenticated with use of the image capture unit 201, and generates divided eyeball images by dividing the region of the eyeball image in accordance with brightness information with use of the image processing unit 203, similarly to the learning apparatus 100. Then, the inference unit 204 collates the inference models of the person registered through the inference processing for personal registration with the characteristic amounts computed by performing the inference from the eyeball image of the person to be authenticated, and stores the collated result into the storage unit 202.

The authentication unit 205 is a computer including a processor, which performs personal authentication for determining whether a person to be authenticated is a registered person in accordance with the collated result that has been stored into the storage unit 202 through the inference processing for personal authentication, and stores the authentication result into the storage unit 202, as well as a memory. Personal authentication is performed by determining whether the number of divided eyeball images having a matching degree equal to or higher than a predetermined value is equal to or larger than the predetermined number, or whether the total of the areas of divided eyeball images having a matching degree equal to or higher than a predetermined value is equal to or larger than a predetermined value. Alternatively, in performing personal authentication, a variable rate may be set for reliability degrees in accordance with brightness of divided eyeball images with respect to the inference results of respective divided eyeball images (a high rate may be set for a reliable inference result), or priority may be given to an inference result with a high reliability degree over an inference result with a low reliability degree.

The notification unit 206 notifies the person to be authentication of the authentication result of the authentication unit 205. Examples of the notification method include a notification that is displayed on a non-illustrated display mounted on the personal authentication apparatus or given in the form of a sound via a speaker, a notification that is displayed on an external display connected to the personal authentication apparatus via a dedicated cable or given in the form of a sound via an external speaker, and so on.

A description is now given of the examples in which external light reflects in an eyeball image with reference to FIGS. 8A to 8H. In the present embodiment, an example of a case where an eyeball image of a user who looks into the finder has been captured is described.

Figure 8A:
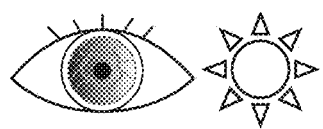
FIGS. 8A to 8H are diagrams illustrating examples in which external light reflects on an eyeball.
Figure 8B:
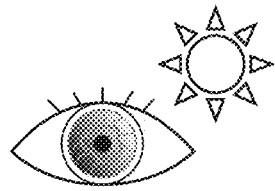
Figure 8C:
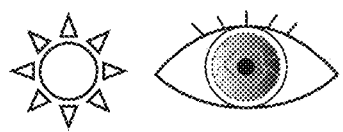
Figure 8D:
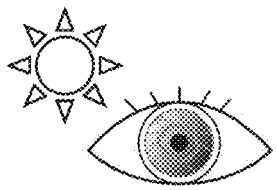

As shown in FIGS. 8A to 8H, an eyeball image captured under external light is influenced by the reflection over a wide range. The intensity of infrared components included in solar light is high, and infrared components from not only direct sunlight but also an object that reflected sunlight are incident on the eyeball from various angles. For example, FIG. 8A illustrates an example of the reflection in a case where light is incident on the eyeball looking into the finder at an angle that is almost sideways. In FIG. 8A, although the intensity of incident infrared light is low and the pattern of the iris has not disappeared, the captured eyeball image shows different levels of brightness in an iris region because the eyeball is a sphere. Also, as shown in FIG. 8A to FIG. 8D, the region in which the pattern of the iris cannot be obtained, or the locations in which a bright portion and a dark portion exist in the iris region, vary depending on the incidence direction of infrared light.

In this way, the brightness of the iris region, as well as the distribution of the bright portion and the dark portion, varies with each eyeball image depending on the incidence direction of external light; therefore, with conventional personal authentication methods, erroneous detection occurs, and it is difficult to obtain a correct personal authentication result. Furthermore, as shown in FIG. 8E to FIG. 8H, when infrared light included in external light is incident on the eyeball with high intensity, a luminance pattern indicating saturated luminance values emerges in an iris region corresponding to the incidence direction of external light. In this case, the pattern of the iris partially disappears, and the characteristic amounts of the eyeball image cannot be obtained; therefore, with conventional personal authentication methods, it is difficult to obtain a correct personal authentication result.

FIGS. 9A to 9F illustrate examples in which the iris region of the eyeball image has been divided in accordance with brightness. The image processing unit 103 and the image processing unit 203 detect luminance values of the eyeball image for respective pixels, compute a luminance pattern corresponding to regions in which pixels having similar luminance values, or luminance values within a predetermined luminance range, are distributed, and divide the region of the eyeball image in accordance with the luminance pattern.

Figure 9A:
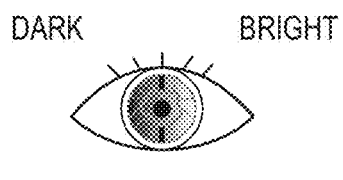
FIGS. 9A to 9F are diagrams illustrating examples in which a region of an eyeball image has been divided.

FIG. 9A illustrates an example of an eyeball image in a case where infrared light is incident on the eyeball from the left side from the standpoint of the eyeball. In FIG. 9A, the luminance of pixels is high and a bright image is obtained on the left side of the eyeball (the right side when facing FIG. 9A), whereas a dark image is obtained on the right side of the eyeball (the left side when facing FIG. 9A). In FIG. 9A, for example, in a case where the iris region centered at the pupil is segmentalized into left and right parts based on a luminance threshold, divided eyeball images are generated by dividing the iris region of the eyeball image into left and right parts.

Figure 9B:
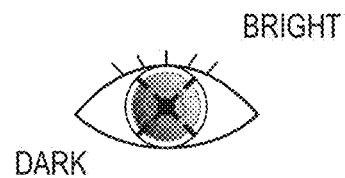
Figure 9C:
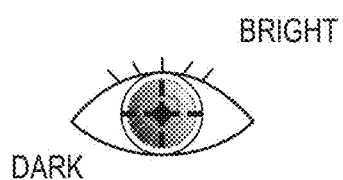
Figure 9D:
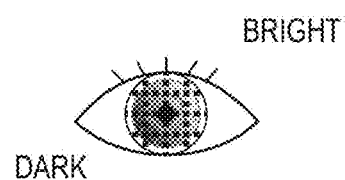

As shown in FIG. 9B, in a case where infrared light is incident on the eyeball obliquely from above, it is possible to use a method of dividing the iris region of the eyeball image centered at the pupil radially into upper, lower, left, and right parts at a 90° interval. Furthermore, it is also possible to use a method of dividing the iris region of the eyeball image horizontally and vertically as shown in FIG. 9C, a method of dividing the iris region of the eyeball image in a grid pattern as shown in FIG. 9D, or a method of dividing the same at an angle smaller than the division angle of FIG. 9B (90°).

Figure 8E:
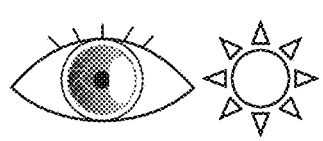
Figure 8F:
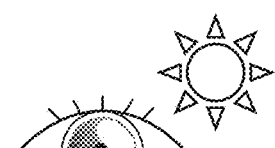
Figure 8G:
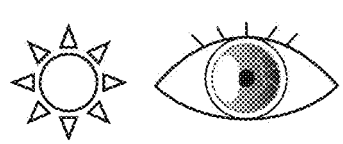
Figure 8H:
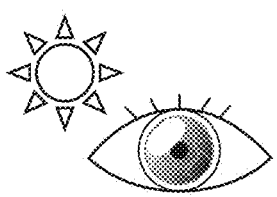
Figures 9E, 9F:
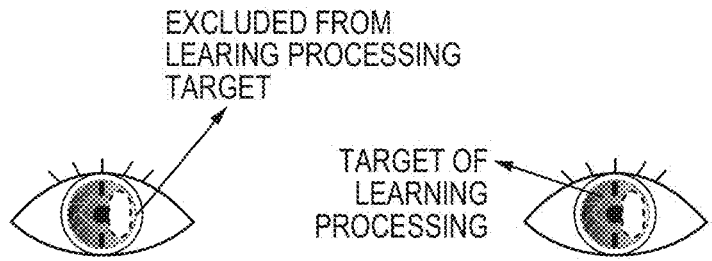

Also, as shown in FIG. 8E to FIG. 8G, in a case where the intensity of infrared light included in external light incident on the eyeball is high, the pixel values of a part of the iris region of the eyeball image may exceed a predetermined value and become saturated, and the characteristic amounts of the iris region of the eyeball image may be lost. In this case, as shown in FIG. 9E, the saturated region is divided by, for example, detecting the edges through filter processing and detecting luminance values of edge coordinates or derivative values of an output of the filter processing. Then, a region other than the saturated regions is used in learning processing. Also, as shown in FIG. 9F, the division may be performed from the center of the eyeball image in the vertical direction, and a region other than the saturated regions may be used.

In the present embodiment, brightness information, such as an average luminance value of divided regions, is computed and stored for each of the divided eyeball image of eyeball images of a person targeted to be learned, a person to be registered, and a person to be authenticated. Also, position information of each divided eyeball image in relation to an eyeball image is stored. For example, in order to compare the characteristic amounts of divided eyeball images of an eyeball image of a person to be authenticated with the characteristic amounts of divided eyeball images of an eyeball image of a registered person corresponding to that eyeball image (inference models), position information indicating to which part of an eyeball image each divided eyeball image corresponds is stored. For example, when dividing an eyeball image, the location of the pupil is searched for. As a method of searching for the pupil, the user's point of view is guided by displaying an index on the finder into which the person to be registered or the person to be authenticated looks. A region of the eyeball is limited based on the index used in the guidance, and the limited region in the eyeball image is regarded as the pupil in a case where the pixel at the coordinates with the smallest pixel value within the limited region has a luminance value equal to or smaller than a predetermined threshold. In a case where the pupil has been successfully searched for, the eyeball image centered at the pupil is divided in accordance with detected brightness information. In this way, the positions of the divided eyeball images in the eyeball image centered at the pupil are specified.

In the foregoing manner, in the learning processing, CNN weight information is computed based on divided eyeball images obtained by dividing the region of an eyeball image in accordance with brightness information, brightness information of each divided eyeball image, and position information of each divided eyeball image in relation to the eyeball image. In the inference processing, inference processing for personal registration and inference processing for personal authentication are performed using the CNN weight information computed in the learning processing.

[Software Configuration of Learning Unit 104]

Next, a software configuration of the learning unit 104 will be described with reference to FIG. 3.

A learning image obtaining unit 1040 obtains divided eyeball images 1042 according to brightness of an eyeball image generated by the image processing unit 103, and divided image information 1041 including brightness information of the divided eyeball images 1042 and position information of the divided eyeball images 1042 in relation to the eyeball image. Using the divided eyeball images 1042 as an input, the learning unit 104 performs learning processing, computes CNN weight information 1049, and outputs output values 1048 corresponding to the divided image information 1041.

Figure 3:
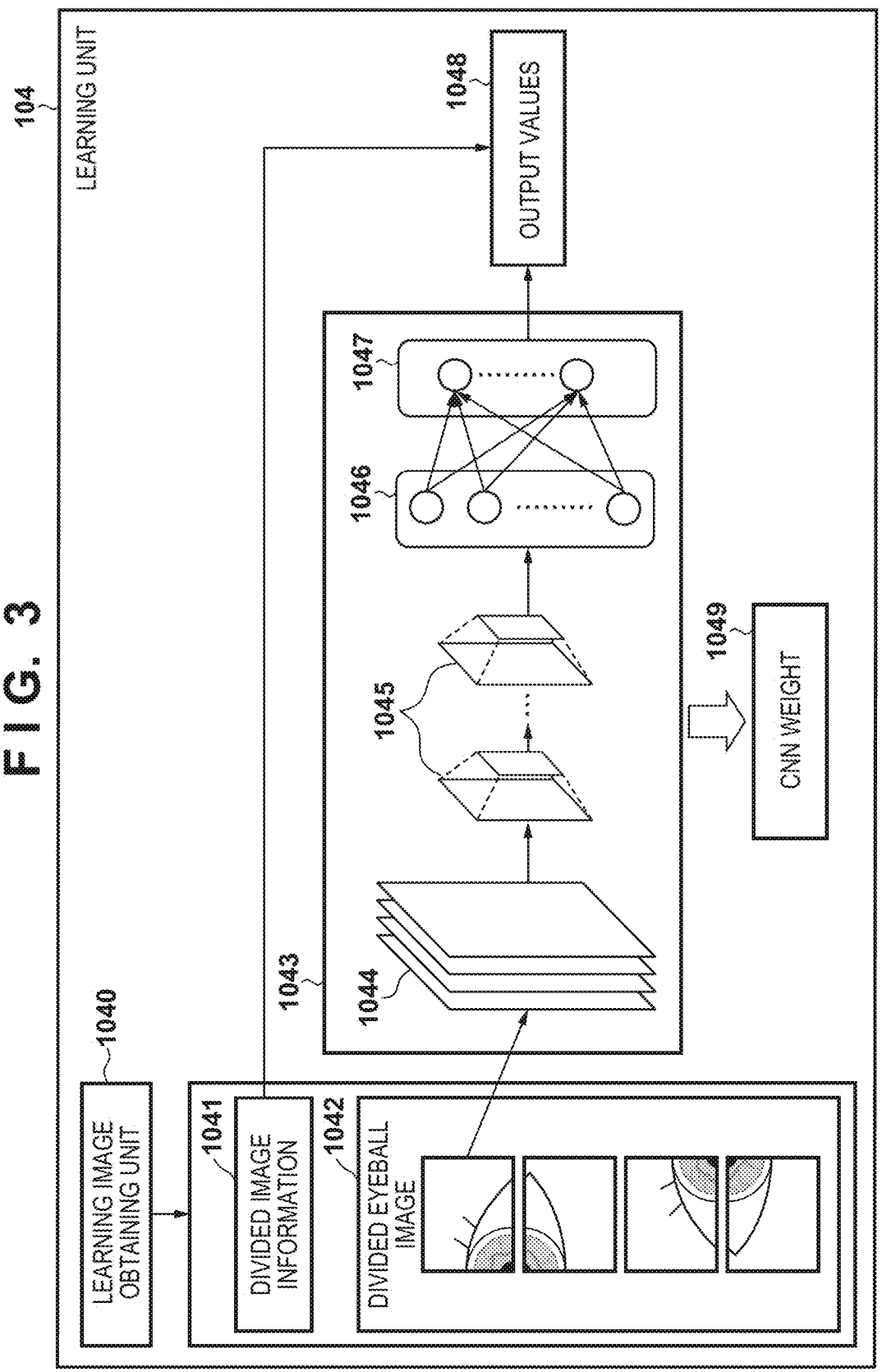
FIG. 3 is a diagram illustrating a software configuration of the learning apparatus of the present embodiment.

As shown in FIG. 3, a learning device that performs the learning processing is a CNN 1043 that performs learning processing of a neural network. The CNN 1043 includes, for example, convolutional layers 1044, pooling layers 1045, a fully connected layer 1046, and an output layer 1047.

The convolutional layers 1044 are examples of input layers, and are layers that perform a convolution operation with respect to images. Convolution of images is equivalent to processing for calculating a correlation with a certain filter.

The pooling layers 1045 are layers that perform pooling processing. The pooling processing sets the maximum value of the output values of connected neurons in the convolutional layers 1044, and realizes consistency of a response to a single minute change in the characteristics shown in an image.

The fully connected layer 1046 is a layer in which all of the neurons are connected between neighboring layers. Each neuron included in the fully connected layer 1046 is connected to every neuron included in neighboring layers. Although the fully connected layer 1046 is illustrated as only one layer in FIG. 3, it may be composed of a plurality of layers.

The output layer 1047 is a layer that is placed farthest on the output side of the CNN 1043.

A threshold is set for each neuron; basically, the output of each neuron is determined based on whether the sum of the products of respective inputs and respective weights exceeds the threshold.

When the divided eyeball images 1042 have been input to the convolutional layers 1044, which are placed farthest on the input side of the CNN 1043, the learning unit 104 constructs the CNN 1043 that outputs the output values 1048 corresponding to the divided image information 1041 from the output layer 1047. In this way, the learning unit 104 obtains information indicating the configuration of the CNN 1043, the weights of connections among respective neurons, and the thresholds of neurons, and stores the same into the storage unit 102 as the CNN weight information 1049.

[Learning Processing in Learning Apparatus 100]

Next, the learning processing in the learning apparatus 100 will be described with reference to FIG. 1, FIG. 3, and FIG. 4.

Figure 4:
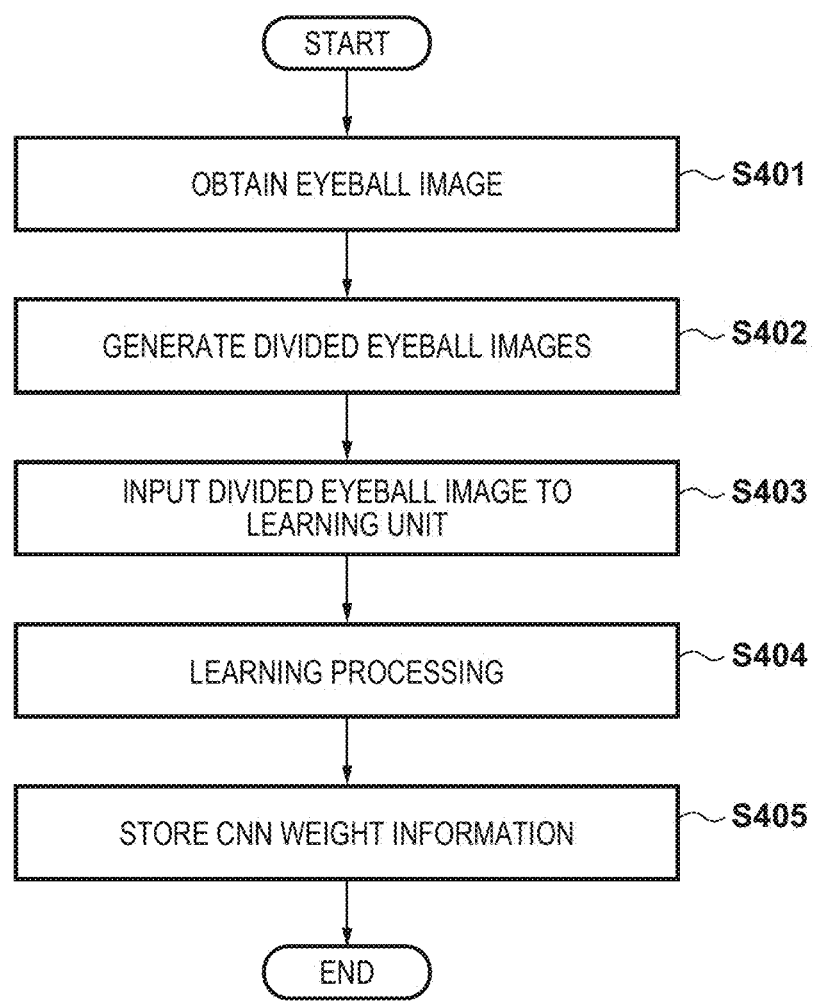
FIG. 4 is a flowchart illustrating learning processing performed by the learning apparatus of the present embodiment.

Note that processing of FIG. 4 is realized by the computer of the learning apparatus 100 executing a program and controlling each component of the learning apparatus 100. Also, processing of each step of FIG. 4 may be changed to the extent possible. Furthermore, steps can be omitted, replaced, and added as appropriate in accordance with an embodiment.

In step S401, the image capture unit 101 captures an eyeball image of a person to be learned, and stores the eyeball image into the storage unit 102.

In step S402, the image processing unit 103 generates divided eyeball images 1042 according to brightness from the eyeball image obtained in step S401. Also, the image processing unit 103 generates divided image information 1041 including brightness information of the divided eyeball images 1042 and position information of the divided eyeballs.

In step S403, the learning unit 104 inputs the divided eyeball images 1042 and the divided image information 1041, which are generated in step S402, to the learning image obtaining unit 1040.

In step S404, using the divided eyeball images 1042 and the divided image information 1041 that are input in step S403 as an input, the learning unit 104 executes the learning processing of the CNN 1043, and computes the CNN weight information 1049 corresponding to the output values 1048.

Specifically, the CNN 1043, with respect to which the learning processing is performed, is prepared. Regarding the CNN weight information 1049, which represents the configuration of the CNN 1043 prepared here, the initial values of weights of connections among respective neurons, and the initial values of the thresholds of respective neurons, a template may be used thereas, or it may be provided through an operator's input. Also, in a case where re-learning is performed, the learning unit 104 may prepare the CNN 1043 based on the CNN weight information 1049 with respect to which re-learning is performed.

In step 405, the learning unit 104 stores information indicating the configuration of the CNN 1043, the weights of connections among respective neurons, and the thresholds of respective neurons, which are computed through the learning processing in step S404, into the storage unit 102 as the CNN weight information 049. As described above, in the learning processing in the learning apparatus 100, the CNN weight information used in later-described inference processing is computed by executing learning processing for each of the divided eyeball images obtained by dividing the eyeball image in accordance with brightness information, and the CNN weight information is stored into the storage unit 202.

[Software Configuration of Inference Unit 204]

Figure 5:
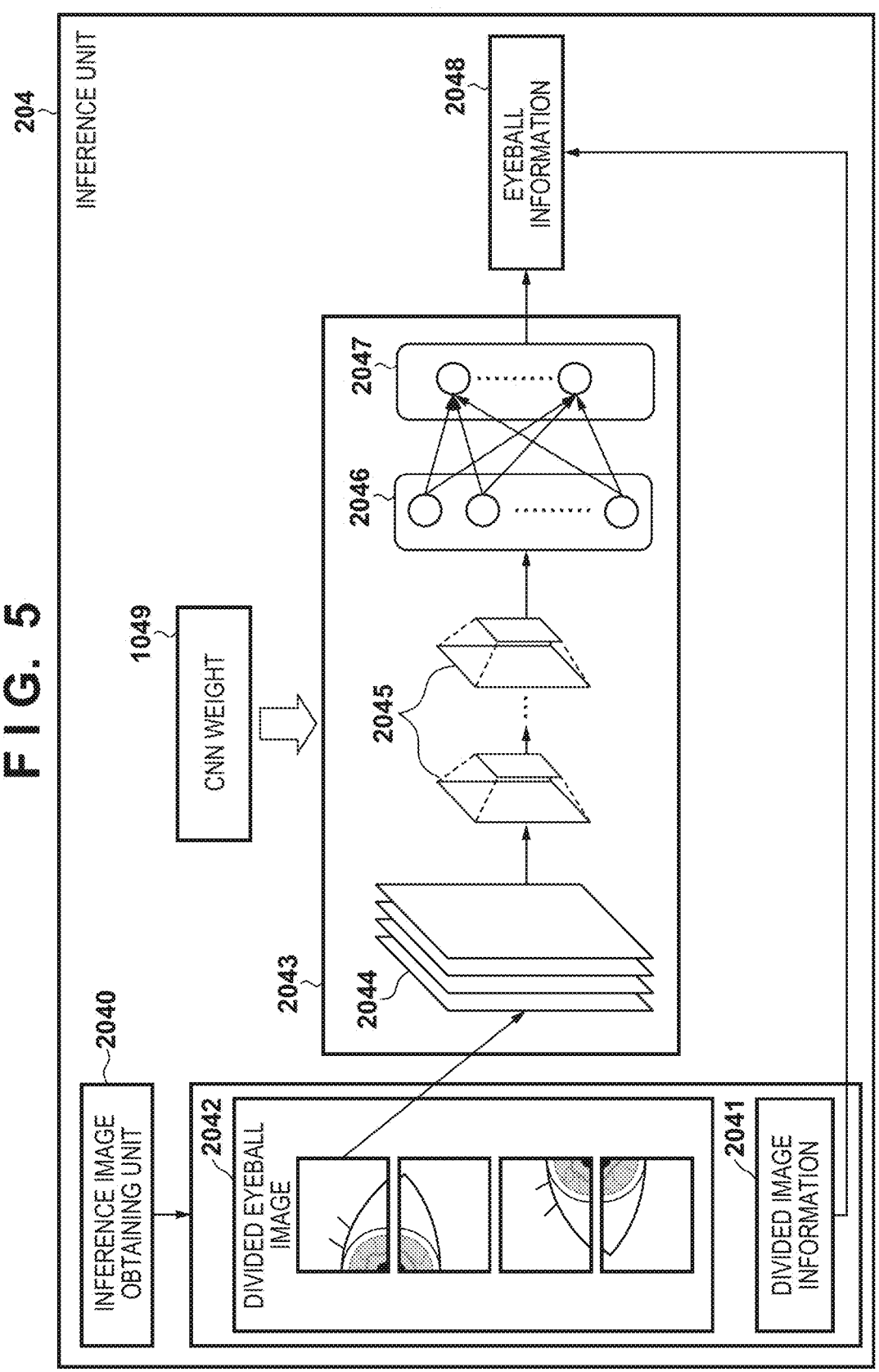
FIG. 5 is a diagram illustrating a software configuration of the inference apparatus of the present embodiment.

Next, a software configuration of the inference unit 204 will be described with reference to FIG. 5.

An inference image obtaining unit 2040 obtains divided eyeball images 2042 generated by the image processing unit 203, and divided image information 2041 including brightness information of the divided eyeball images 2042 and position information of the divided eyeball images 2042 in relation to an eyeball image. Using the CNN weight information 1049 computed in the learning unit 104, the inference unit 204 performs inference processing for personal registration using the divided eyeball images 2042 of the eyeball image of a person to be registered as an input, and outputs eyeball information 2048 corresponding to the divided image information 2041. Also, using the CNN weight information 1049 computed in the learning unit 104, the inference unit 204 performs inference processing for personal authentication using the divided eyeball images 2042 of the eyeball image of a person to be authenticated as an input, and outputs eyeball information 2048 corresponding to the divided image information 2041. As shown in FIG. 5, an inference device that performs inference processing is a CNN 2043 that performs inference processing of a neural network.

The CNN 2043 includes, for example, convolutional layers 2044, pooling layers 2045, a fully connected layer 2046, and an output layer 2047, and is configured similarly to the CNN 1043 of the learning unit 104. Also, the layers 2044 to 2047 are similar to the layers 1044 to 1047 in the CNN 1043 of the learning unit 104, respectively, and thus a description thereof is omitted.

Information indicating the configuration of the CNN 2043, the weights of connections among respective neurons, and the thresholds of respective neurons, which is used in the inference processing for personal registration for a person to be registered and the inference processing for personal authentication for a person to be authenticated, is set with reference to the CNN weight information 1049.

Using the divided eyeball images 2042 and the divided image information 2041 as an input, the inference unit 204 computes the characteristic amounts of an eyeball image of a user through inference processing of the CNN 2043 with use of the CNN weight information 1049, which has been generated through the learning processing that has been performed in the learning apparatus 100 for each of the divided eyeball images 2042, and stores the characteristic amounts into the storage unit 102.

[Inference Processing for Personal Registration in Inference Apparatus 200]

Next, the inference processing for personal registration in the inference apparatus 200 will be described with reference to FIG. 2, FIG. 5, and FIG. 6.

Figure 6:
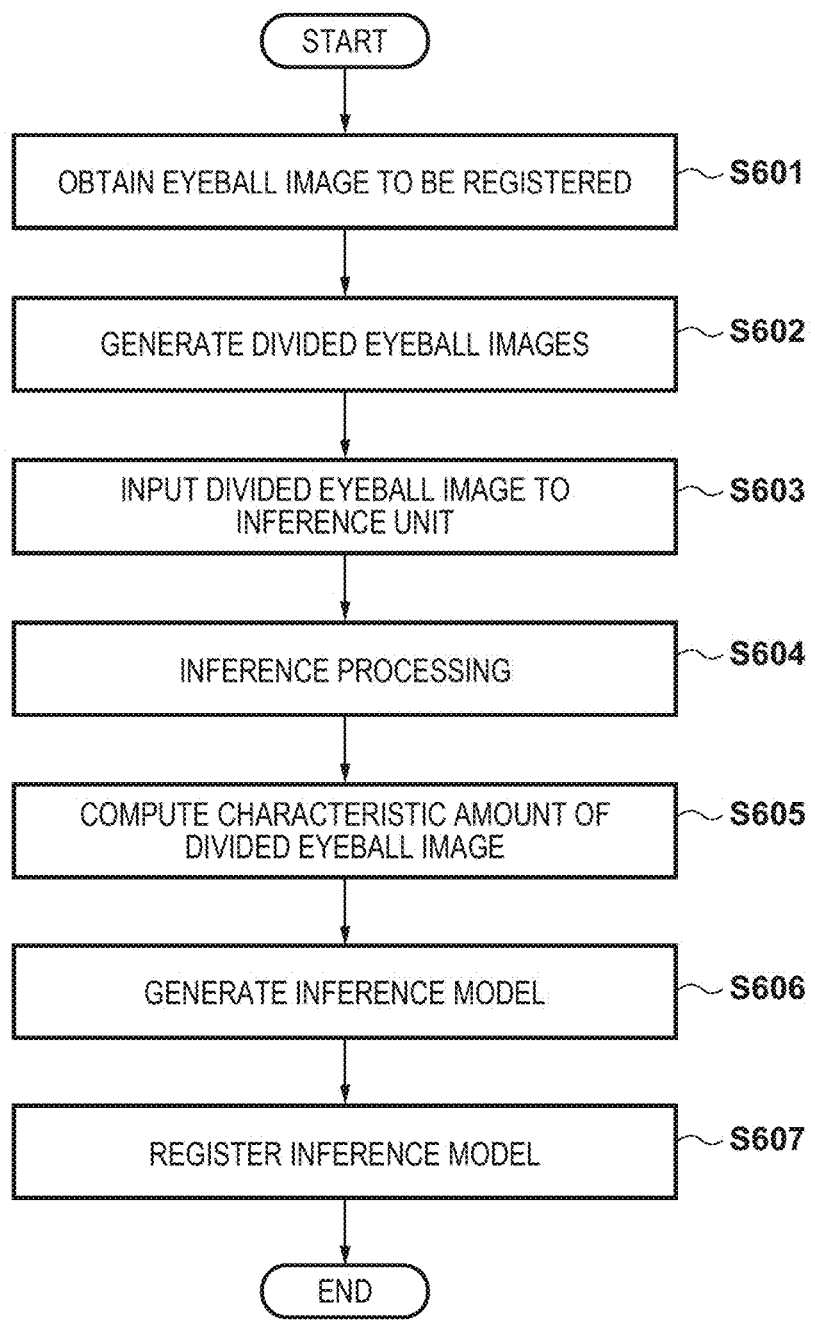
FIG. 6 is a flowchart illustrating inference processing for personal registration, which is performed by the inference apparatus of the present embodiment.

Note that processing of FIG. 6 is realized by the computer of the inference apparatus 200 executing a program and controlling each component of the inference apparatus 200. Also, processing of each step of FIG. 6 may be changed to the extent possible. Furthermore, steps can be omitted, replaced, and added as appropriate in accordance with an embodiment. The same goes for FIG. 7, which will be described later.

In step S601, the image capture unit 201 captures an eyeball image of a person to be registered, and stores the eyeball image into the storage unit 202.

In step S602, the image processing unit 203 generates divided eyeball images 2042 according to brightness from the eyeball image obtained in step S601.

In step S603, the inference unit 204 inputs the divided eyeball images 2042 generated in step S602.

In step S604, using the divided eyeball images 2042 input in step S603 as an input, the inference unit 204 executes inference processing of the CNN 2043.

In step S605, using the CNN weight information 1049 that has been computed through the learning processing in the learning apparatus 100, the inference unit 204 obtains, for each of the divided eyeball images 2042, eyeball information 2048 corresponding to the characteristic amount of the divided eyeball image 2042 of a person to be registered from the CNN 2043. It is assumed that information obtained from the CNN 2043 is, for example, the eyeball information 2048 in which the characteristic amounts of the divided eyeball images are associated with the divided image information 2041 that includes brightness information and position information of the divided eyeball images.

In step S606, the inference unit 204 generates an inference model from the eyeball information 2048 obtained in step S605 for each divided eyeball image.

In step S607, the inference unit 204 stores the inference models generated in step S606 into the storage unit 202.

As described above, in the inference processing for personal registration in the inference apparatus 200, by way of the inference processing of the CNN that uses the CNN weight information 1049 computed through the learning processing in the learning apparatus 100, eyeball information is obtained from divided eyeball images obtained by dividing an eyeball image of a person to be registered in accordance with brightness information, and inference models of the person to be registered are stored into the storage unit 202.

[Inference Processing for Personal Authentication in Inference Apparatus 200]

Next, the inference processing for personal authentication in the inference apparatus 200 will be described with reference to FIG. 2, FIG. 5, and FIG. 7.

Note that the software configuration of the inference unit 204 in the inference processing for personal authentication is similar to the software configuration of the inference unit 204 in the inference processing for personal registration.

In step S701, the image capture unit 201 captures an eyeball image of a person to be authenticated, and stores the eyeball image into the storage unit 202.

In step S702, the image processing unit 203 generates divided eyeball images 2042 according to brightness from the eyeball image obtained in step S701.

In step S703, the inference unit 204 inputs the divided eyeball images 2042 generated in step S702.

In step S704, using the divided eyeball images 2042 input in step S703 as an input, the inference unit 204 executes inference processing of the CNN 2043.

In step S705, using the CNN weight information 1049 that has been computed through the learning processing in the learning apparatus 100, the inference unit 204 obtains, for each of the divided eyeball images, eyeball information 2048 corresponding to the characteristic amount of the divided eyeball image of a person to be registered from the CNN 2043. It is assumed that the eyeball information 2048 obtained from the CNN 2043 is, for example, information in which the characteristic amounts of the divided eyeball images are associated with the divided image information 2041 that includes brightness information and position information of the divided eyeball images.

In step S706, the authentication unit 205 reads out the inference models generated in step S606 of FIG. 6 from the storage unit 202. Also, the authentication unit 205 inputs the eyeball information 2048 obtained in step S705. Then, the authentication unit 205 collates the inference models with the eyeball information 2048.

In step S707, the authentication unit 205 performs authentication processing for determining whether the person to be authenticated is a person who has already been registered with the inference models based on the collated result in step S706.

In step S708, the notification unit 206 notifies the person to be authenticated of the authentication result determined in step S707.

As described above, in the inference processing for personal authentication in the inference apparatus 200, by way of the inference processing of the CNN that uses the CNN weight information 1049 computed through the learning processing in the learning apparatus 100, eyeball information is obtained from divided eyeball images obtained by dividing an eyeball image of a person to be authenticated in accordance with brightness information, and the person to be authenticated is notified of the authentication result obtained by collating the registered inference models with the eyeball information.

As described above, according to the personal authentication apparatus of the present embodiment, a decrease in the authentication accuracy due to exposure and reflection of external light on the can be suppressed by performing the learning processing, the inference processing for personal registration, and the inference processing for personal authentication for each of divided eyeball images generated in accordance with brightness information of an eyeball image.

Other Embodiments

Although the above embodiment has been described using an example in which the learning apparatus 100 and the inference apparatus 200 in the personal authentication apparatus are configured as separate entities, it is permissible to adopt a configuration in which they are configured integrally, and an image capture unit, a storage unit, and an image processing unit are mutually used in learning processing and inference processing.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-132949, filed Aug. 17, 2021 which is hereby incorporated by reference herein in its entirety.

What is claimed is:

1. A personal authentication apparatus comprising:
an image capture device configured to capture an eyeball image;

a memory and at least one processor configured to read out and execute instructions stored in the at least one memory to thereby cause the apparatus to:
obtain a luminance pattern of the eyeball image captured by the first image capture device, wherein the luminance pattern corresponds to a region in which pixels having luminance values within a predetermined luminance range are distributed;
generate divided eyeball images by dividing an iris region of the eyeball image based on the luminance pattern of the eyeball image;
store brightness information of the divided iris regions of the eyeball images and position information of the divided iris regions of the eyeball images in relation to the eyeball image in association with each other;
use the brightness information and the position information of the divided iris regions of the eyeball images as input data for learning processing; and
perform different types of learning processing for respective divided iris regions of the eyeball images,
wherein the different types of learning processing for the respective divided iris regions of the eyeball images use different brightness information for each divided iris region and different position information for each divided iris region relative to the eyeball image.

2. The apparatus according to claim 1, wherein the image capture device is a first image capture device,
wherein apparatus further comprises a second image capture device, and
wherein the at least one processor is further configured to read out and execute instructions stored in the at least one memory to thereby cause the apparatus to:
obtain brightness information of the eyeball image captured by the second image capture device,
generate divided eyeball images by dividing an iris region of the eyeball image captured by the second image capture device based on the brightness information of the eyeball image captured by the second image capture device;
store brightness information of the divided iris regions of the eyeball images and position information of the divided iris regions of the eyeball images in relation to the eyeball image captured by the second image capture device in association with each other;
perform inference processing for each of divided iris regions of the eyeball images with respect to eyeball images of a person to be registered and a person to be authenticated, which have been captured by the second image capture device, with use of weight information of a learning device obtained through learning processing that has been performed by the learning unit for each of the divided eyeball images, and compute characteristic amounts of the divided eyeball images;
perform authentication processing for collating the characteristic amounts of the respective divided iris regions of the eyeball images of the person to be registered with the characteristic amounts of the respective divided iris regions of the eyeball images of the person to be authenticated, the characteristic amounts having been computed in the inference processing; and
give notice of a result of the authentication processing.

3. The apparatus according to claim 2, wherein the at least one processor is further configured to read out and execute instructions stored in the at least one memory to thereby cause the apparatus to set regions into which the iris region of the eyeball image is divided based on a distribution of luminance values detected from the iris region of the eyeball image.

4. The apparatus according to claim 2, wherein the brightness information includes a direction and an intensity of incidence of external light on an eyeball, and
the at least one processor is further configured to read out and execute instructions stored in the at least one memory to thereby cause the apparatus to compute weights that are used when machine learning for each of the divided iris regions of the eyeball images.

5. The apparatus according to claim 2, wherein the at least one processor is further configured to read out and execute instructions stored in the at least one memory to thereby cause the apparatus to perform the authentication processing by determining whether the number of divided iris regions of the eyeball images with a matching degree equal to or higher than a predetermined value is equal to or larger than a predetermined number, or whether a total of areas of divided iris regions of the eyeball images with a matching degree equal to or higher than a predetermined value is equal to or larger than a predetermined value.

6. A method of controlling a personal authentication apparatus, the method comprising:
capturing an eyeball image;
obtaining a luminance pattern of the captured eyeball image, wherein the luminance pattern corresponds to a region in which pixels having luminance values within a predetermined luminance range are distributed,
generating divided eyeball images by dividing an iris region of the eyeball image based on the luminance pattern of the eyeball image;
storing brightness information of the divided iris regions of the eyeball images and position information of the divided iris regions of the eyeball images in relation to the eyeball image in association with each other;
use the brightness information and the position information of the divided iris region of the eyeball images as input data for learning processing; and
preform different types of learning processing for respectively divided iris regions of the eyeball images,
wherein the different types of learning processing for the respective divided iris regions of the eyeball images use different brightness information for each divided iris region and different position information for each divided iris region relative to the eyeball image.

7. A non-transitory computer-readable storage medium storing a program for causing a computer to:
obtain an eyeball image;
obtain a luminance pattern of the captured eyeball image, wherein the luminance pattern corresponds to a region in which pixels having luminance values within a predetermined luminance range are distributed,
generate divided eyeball images by dividing an iris region of the eyeball image based on the luminance pattern of the eyeball image;
store brightness information of the divided iris regions of the eyeball images and position information of the divided iris regions of the eyeball images in relation to the eyeball image in association with each other;
use the brightness information and the position information of the divided iris regions of the eyeball images as input data for learning processing; and
preform different types of learning processing for respectively divided iris regions of the eyeball images,
wherein the different types of learning processing for the respective divided iris regions of the eyeball images use different brightness information for each divided iris region and different position information for each divided iris region relative to the eyeball image.

* * * * *